(12) United States Patent
Li

(10) Patent No.: US 12,200,073 B1
(45) Date of Patent: Jan. 14, 2025

(54) DEPENDENCY DETERMINATION IN A MICROSERVICES-BASED SYSTEM

(71) Applicant: SAP SE, Walldorf (DE)

(72) Inventor: Hui Li, Shanghai (CN)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 18/511,292

(22) Filed: Nov. 16, 2023

(51) Int. Cl.
*H04L 67/51* (2022.01)
*H04L 67/02* (2022.01)

(52) U.S. Cl.
CPC .............. *H04L 67/51* (2022.05); *H04L 67/02* (2013.01)

(58) Field of Classification Search
CPC ................................ H04L 67/02; H04L 67/51
See application file for complete search history.

(56) References Cited

U.S. PATENT DOCUMENTS

| | | | | |
|---|---|---|---|---|
| 10,754,709 | B2* | 8/2020 | Jain | G06F 9/4881 |
| 11,736,580 | B1* | 8/2023 | Bhuyan | H04L 41/16 |
| 11,968,086 | B1* | 4/2024 | Shpilyuck | H04L 67/63 |
| 11,973,839 | B1* | 4/2024 | Nagpal | H04L 67/51 |
| 12,028,229 | B2* | 7/2024 | Dickgiesser | H04L 43/0817 |
| 2020/0097333 | A1* | 3/2020 | Jain | G06F 9/52 |
| 2021/0058455 | A1* | 2/2021 | Kozhaya | H04L 47/805 |
| 2021/0216444 | A1* | 7/2021 | Gefen | G06F 11/3688 |
| 2022/0188104 | A1* | 6/2022 | Wan | G06F 9/547 |

OTHER PUBLICATIONS

Gaidels et al. Service dependency graph analysis in microservice architecture. In Perspectives in Business Informatics Research: 19th International Conference on Business Informatics Research, BIR 2020, Vienna, Austria, Sep. 21-23, 2020, Proceedings 19 (pp. 128-139). Springer (Year: 2020).*
Ma, S. P., Fan, C. Y., Chuang, Y., Lee, W. T., Lee, S. J., & Hsueh, N. L. (Jul. 2018). Using service dependency graph to analyze and test microservices. In 2018 IEEE 42nd Annual Computer Software and Applications Conference (COMPSAC) (vol. 2, pp. 81-86). IEEE. (Year: 2018).*

* cited by examiner

*Primary Examiner* — Thomas J Dailey
(74) *Attorney, Agent, or Firm* — Sterne, Kessler, Goldstein & Fox P.L.L.C.

(57) ABSTRACT

Disclosed herein are system, method, and computer program product embodiments for determining dependency associated with microservices. An embodiment operates by receiving a first request to perform a task associated with the microservices; determining a first microservice and a second microservice responsible for performing the task; prior to transmitting a second request from the first microservice to the second microservice, inserting a first field, a second field and a third field to the second request; generating tracing data associated with the second request; generating a first dependency graph, based on the generated tracing data; determining whether there is a first dependency associated with the microservices based on the first dependency graph; in response to the determination that there is a first dependency, generating a first report; providing for display the first report; and receiving input to modify at least a portion of the microservices.

20 Claims, 16 Drawing Sheets

DEPENDENCY DETERMINATION IN A MICROSERVICES-BASED SYSTEM

BACKGROUND

With the advent of cloud-based applications, new cloud-based environments have been designed for automating mass computer application, deployment, and management. In these cloud-based environments, solutions for computer application deployment commonly involve running numerous microservices. Microservices divide a large and complex system into smaller, independent, and loosely coupled parts, thus fault isolation and scalability can be improved. For example, cloud-based data processing systems may run multiple instances of each microservice and application. As a result, numerous service instances must share the load of the tasks the service instances are assigned to execute. Microservices often use one or more protocols of remote calls for communication, such as REST and gRPC.

A dependency associated microservice can include a circular dependency, such as a circular dependency in a chain of remote calls associated with microservices. Circular dependency is a common anti-pattern associated with microservices, which can be introduced during the process of design and development of the microservice-based system. The scalability or independently deployment associated with the microservices can be negatively impacted by the one or more circular dependencies. An endless chain of remote calls may be triggered and difficult to control due to one or more circular dependencies.

However, it can be challenging and difficult to detect or determine one or more circular dependencies associated with microservices. Circular dependency may be introduced unintentionally for various reasons. In addition, it can be difficult to detect the circular dependency during the process of design and development of the microservice-based system.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof, for determining one or more dependencies associated with microservices. It is noted that terms such as "service" and similar terms may refer to "microservice" as described herein. As described above, it can be challenging and difficult to detect or determine one or more problematic dependencies, such as circular dependencies, associated with microservices. Therefore, a technological solution is needed to detect or determine one or more problematic dependencies, such as circular dependencies, associated with microservices.

The technological solution in the present disclosure can provide a solution for determining one or more problematic dependencies, such as circular dependencies, associated with microservices. Prior to transmitting a request from a first microservice to a second microservice, a first field, a second field and a third field can be inserted into the request. Tracing data can be generated associated with the annotated request. The tracing data can be associated with a timestamp, the first field, the second field, the third field, the second microservice, and an Application Program Interface (API) associated with the second microservice and the second request. A dependency graph can be generated, based at least on the generated tracing data. Microservice dependency information can be determined, using the first dependency graph, to indicate dependency relationships between the first microservice and the second microservice.

Figure 1A:
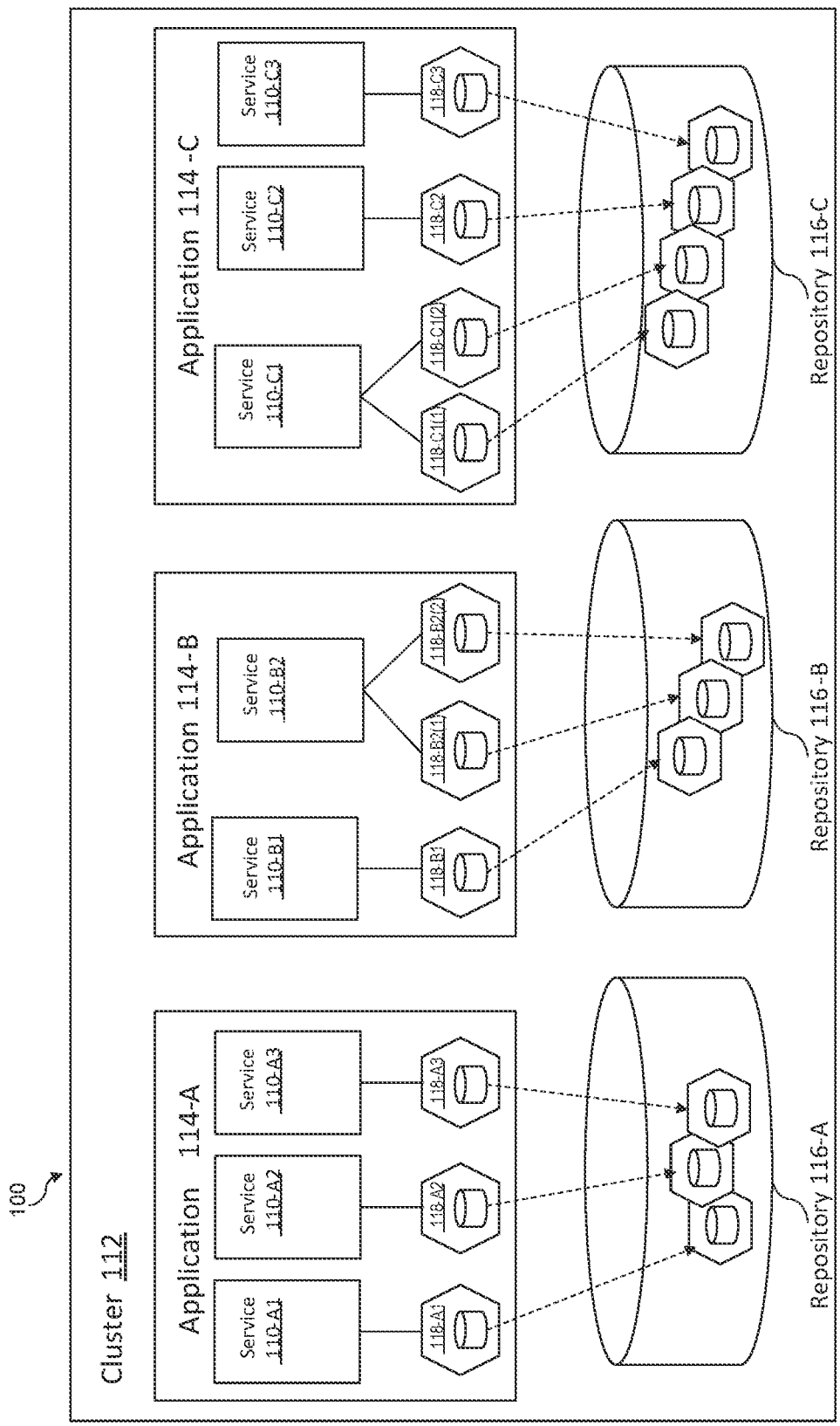
FIG. 1A is a block diagram illustrating a cloud-based data processing system, according to some embodiments.

FIG. 1A is a block diagram illustrating a cloud-based data processing system, according to some embodiments. System 100 is an example embodiment of a cloud-based data processing system. It is noted, however, cloud-based data processing system 100 is provided solely for illustrative purposes and is not limiting Embodiments of this disclosure may be implemented using and/or may be part of system different from and/or in addition to cloud-based data processing system 100, as will be appreciated by persons skilled in the relevant art(s) based on the teachings contained herein. An example of the cloud-based data processing system 100 shall now be described.

System 100 contains one or more applications 114 (114-A, 114-B, 114-C, . . . , 114-X, . . . ). Each application 114 may be a distributed application comprising microservices 110 (110-A1, 110-A2, 110-A3, . . . , 110-X1 . . . ). Each microservice 110 may have several service instances 118 (118-A1, 118-A2, 118-A3, . . . , 118-B2(1), 118-B2(2), . . . ). Applications 114 may be managed by a cluster orchestrator. Cluster 112 may simultaneously host and run multiple applications 114. The set of applications 114 in a cluster 112 can be dynamic, in which the composition of each application 114 may change over time (e.g., due to upgrades) and the set of applications 114 themselves may also change over time.

In order to store the underlying data in a cloud orchestrator, system 100 can use a per-application repository 116 (116-A, 116-B, 116-C, . . . 116-X, . . . ). System 100 can store the data from all the service instances 118 in a single repository 116, such as an object store bucket. Data in a service instance 118 may all belong to the same application 114 and data from different applications 114 may be stored in separate repositories 116. The data may be located in separate service instances 118 each with their own access restrictions.

Figure 1B:
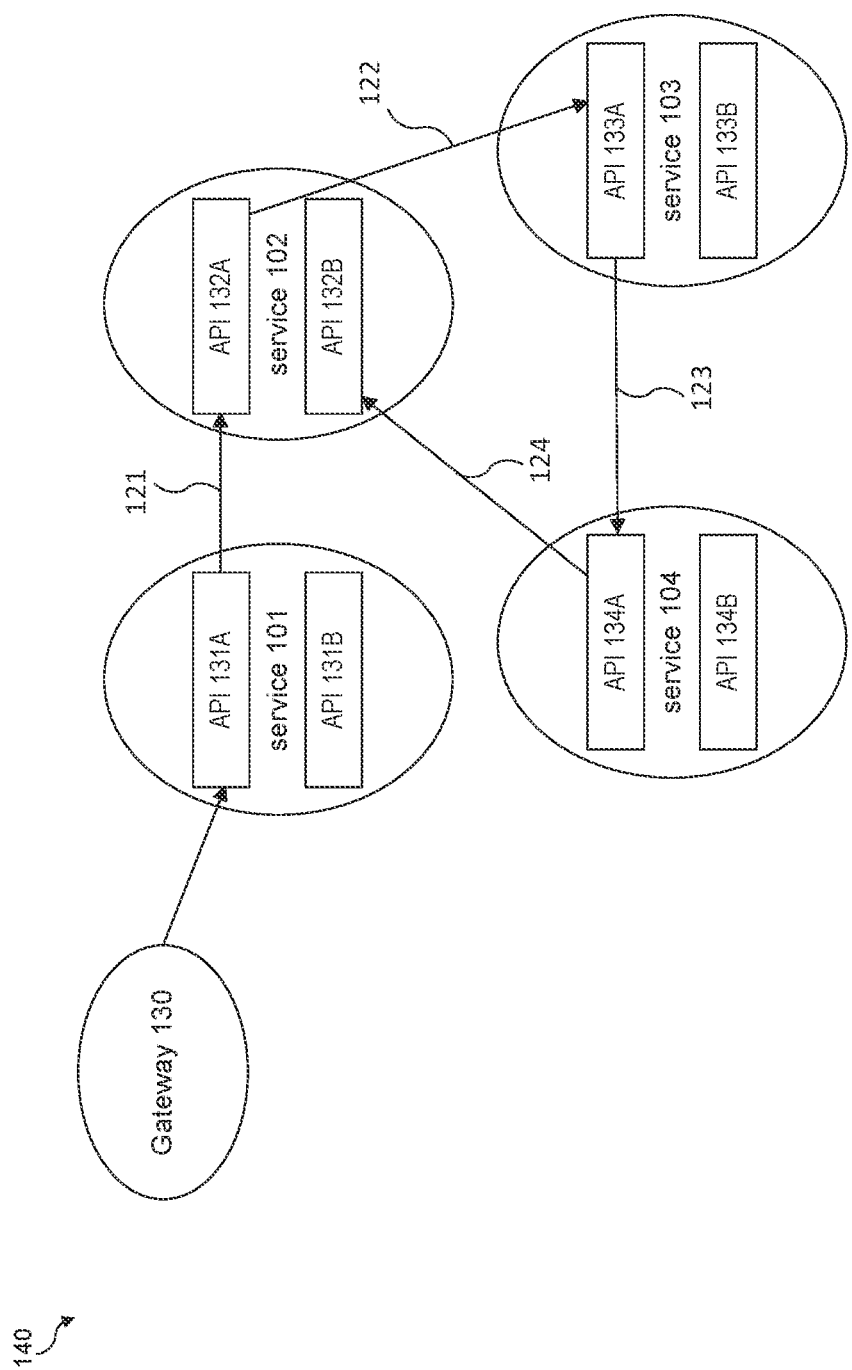
FIG. 1B is a block diagram illustrating a first dependency associated with microservices, according to some embodiments.

FIG. 1B is a block diagram illustrating a first dependency associated with microservices, according to some embodiments. It is noted, however, block diagram 140 is provided solely for illustrative purposes, and is not limiting. Embodiments of this disclosure may be implemented using and/or may be part of system different from and/or in addition to the block diagram, as will be appreciated by persons skilled in the relevant art(s) based on the teachings contained herein.

As shown in FIG. 1B, a request to perform a task can be distributed by gateway 130 to microservices 101, 102, 103, and 104. Microservices 101, 102, 103, and 104 can perform remote calls with call paths 121, 122, 123 and 124 to communicate between them Microservices 101, 102, 103, and 104 can use one or more protocols of remote calls for such as REST and gRPC. As described above, each microservice (e.g., microservices 110) may have several service instances (e.g., 118-A1, 118-A2, 118-A3, . . . , 118-B2(1), 118-B2(2), . . . ). As shown in FIG. 1B, application programming interfaces (APIs) 131A and 131B can be associated with the service instances of microservice 101. APIs 132A and 132B can be associated with the service instances of microservice 102. APIs 133A and 133B can be associated with the service instances of microservice 103. APIs 134A and 134B can be associated with the service instances of microservice 104.

A first dependency, such as a circular dependency, between microservices 102, 103, and 104 is shown as a chain of remote call paths 122, 123 and 124 associated with microservices 102, 103, and 104. For example, there is a circle or circular shape in microservice call paths between microservices 102, 103, and 104. A start point of the microservice call paths between microservices 102, 103, and 104 can correspond to an end point of the microservice call paths between microservices 102, 103, and 104. In some examples, the circular dependency between microservices 102, 103, and 104 can be associated with microservices 102, 103, and 104. It should be noted that since the calls begin with API 132A and end with API 132B, the circular dependency shown in FIG. 1B is a service circular dependency and not an API circular dependency.

Figure 1C:
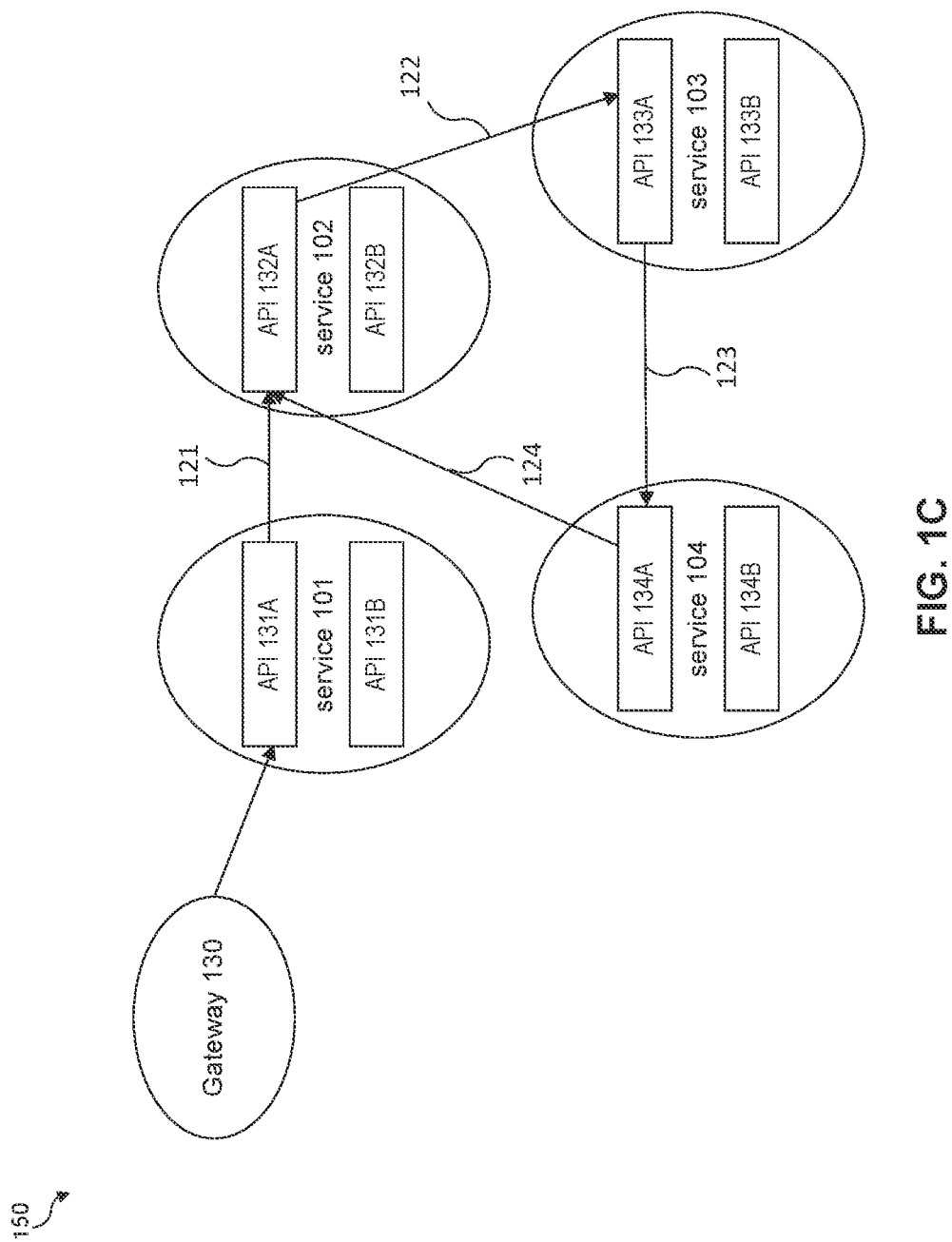
FIG. 1C is a block diagram illustrating a second dependency associated with microservices, according to some embodiments.

FIG. 1C is a block diagram illustrating a second dependency associated with microservices, according to some embodiments. It is noted, however, block diagram 150 is provided solely for illustrative purposes, and is not limiting. Embodiments of this disclosure may be implemented using and/or may be part of system different from and/or in addition to the block diagram, as will be appreciated by persons skilled in the relevant art(s) based on the teachings contained herein.

As shown in FIG. 1C, a request to perform a task can be distributed by gateway 130 to microservices 101, 102, 103, and 104. Microservices 101, 102, 103, and 104 can perform remote calls with call paths 121, 122, 123 and 124 to communicate between them. Microservices 101, 102, 103, and 104 can use one or more protocols such as REST and gRPC. As described above, each microservice (e.g., service 110) may have several service instances (e.g., 118-A1, 118-A2, 118-A3, . . . , 118-B2(1), 118-B2(2), . . . ). As shown in FIG. 1B, application programming interfaces (APIs) 131A and 131B can be associated with the service instances of microservice 101. APIs 132A and 132B can be associated with the service instances of microservice 102. APIs 133A and 133B can be associated with the service instances of microservice 103. APIs 134A and 134B can be associated with the service instances of microservice 104.

A first dependency, such as a circular dependency, between microservices 102, 103, and 104 is shown as a chain of remote call paths 122, 123 and 124 associated with microservices 102, 103, and 104. For example, there is a circle or circular shape in microservice call paths between microservices 102, 103, and 104. A start point of the microservice call paths between microservices 102, 103, and 104 can correspond to an end point of the microservice call paths between microservices 102, 103, and 104.

In addition, a second dependency, such as a second circular dependency, between microservices 102, 103, and 104 is shown as a chain of remote call paths 122, 123 and 124 associated with APIs 132A, 133A, and 134A. For example, there is a circle or circular shape in microservice call paths between APIs 132A, 133A, and 134A. A start point of the microservice call paths between APIs 132A, 133A, and 134A can correspond to an end point of the microservice call paths between APIs 132A, 133A, and 134A. In some examples, the second dependency between microservices 102, 103, and 104 can be associated with APIs associated with microservices 102, 103, and 104 (e.g., 131A, 133A, and 134A).

In some examples, the scalability or independently deployment associated with the microservices can be negatively impacted by the first dependency and the second dependency associated with the microservices shown in FIGS. 1B and 1C. In addition, a more negative impact may be provided by the second dependency compared with the first dependency. For example, an endless chain of remote calls associated with the microservices may be triggered by the second dependency.

Figure 2A:
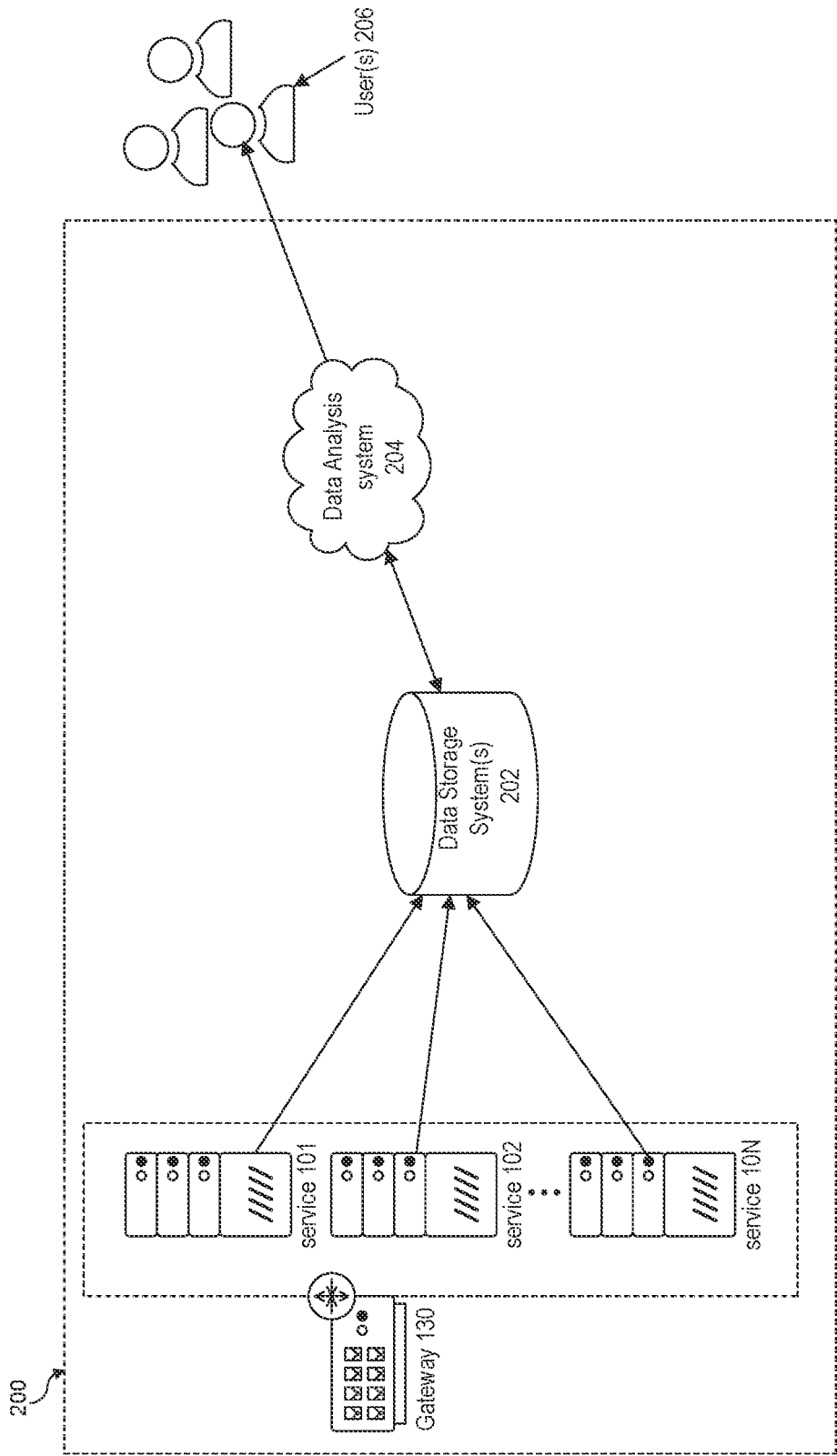
FIG. 2A is a block diagram illustrating an example system for determining dependencies associated with microservices, according to some embodiments.

FIG. 2A is a block diagram illustrating an example system for determining dependencies associated with microservices, according to some embodiments. It is noted, however, data processing system 200 is provided solely for illustrative purposes, and is not limiting. Embodiments of this disclosure may be implemented using and/or may be part of system different from and/or in addition to data processing system 200, as will be appreciated by persons skilled in the relevant art(s) based on the teachings contained herein. An example of data processing system 200 shall now be described.

As shown in FIG. 2A, data processing system 200 includes gateway 130, microservices 101, 102 . . . 10N, one or more data storage systems 202 and data analysis system 204. In some aspects, data processing system 200 may be implemented by one or more computer systems (e.g., servers), virtual machines operating on a computer system, or a combination thereof. In some aspects, data processing system 200 may include or be associated with cluster 112 as described with reference to FIG. 1A.

In some aspects, a request to perform a task can be distributed by gateway 130 to microservices 101, 102 . . . 10N, as described with reference to FIG. 1B-1C. Microservices 101, 102 . . . 10N can perform remote calls with call paths to communicate between them. Microservices 101, 102 . . . 10N can use one or more protocols of remote calls for such as REST and gRPC.

In some aspects, one or more data storage systems 202 may include, but are not limited to, databases, data files, data sources, and the like. Data associated with microservices 101, 102 . . . 10N, such as data associated with the remote calls with call paths, can be transmitted to data storage systems 202.

Data analysis system 204 may retrieve data from one or more data storage systems 202. In some aspects, data analysis system 204 may send one or more queries to one or more data storage systems 202 to retrieve data periodically. Data analysis system 204 may process the retrieved data. Based on the retrieved data from one or more data storage systems 202, data analysis system 204 may send a notification to one or more users 206. The notification may indicate one or more dependencies associated with microservices 101, 102 . . . 10N.

Data analysis system 204 may connect to one or more data storage systems 202 via direct connections including, but not limited to, wired connections, internal connections, bus connections, virtual connections or other types of connections. Alternatively or in addition, data analysis system 204 may connect with one or more data storage systems 202 via a network (not shown). In some aspects, data analysis system 204 can also connect with additional data storage systems that are not shown in FIG. 2A.

Figure 2B:
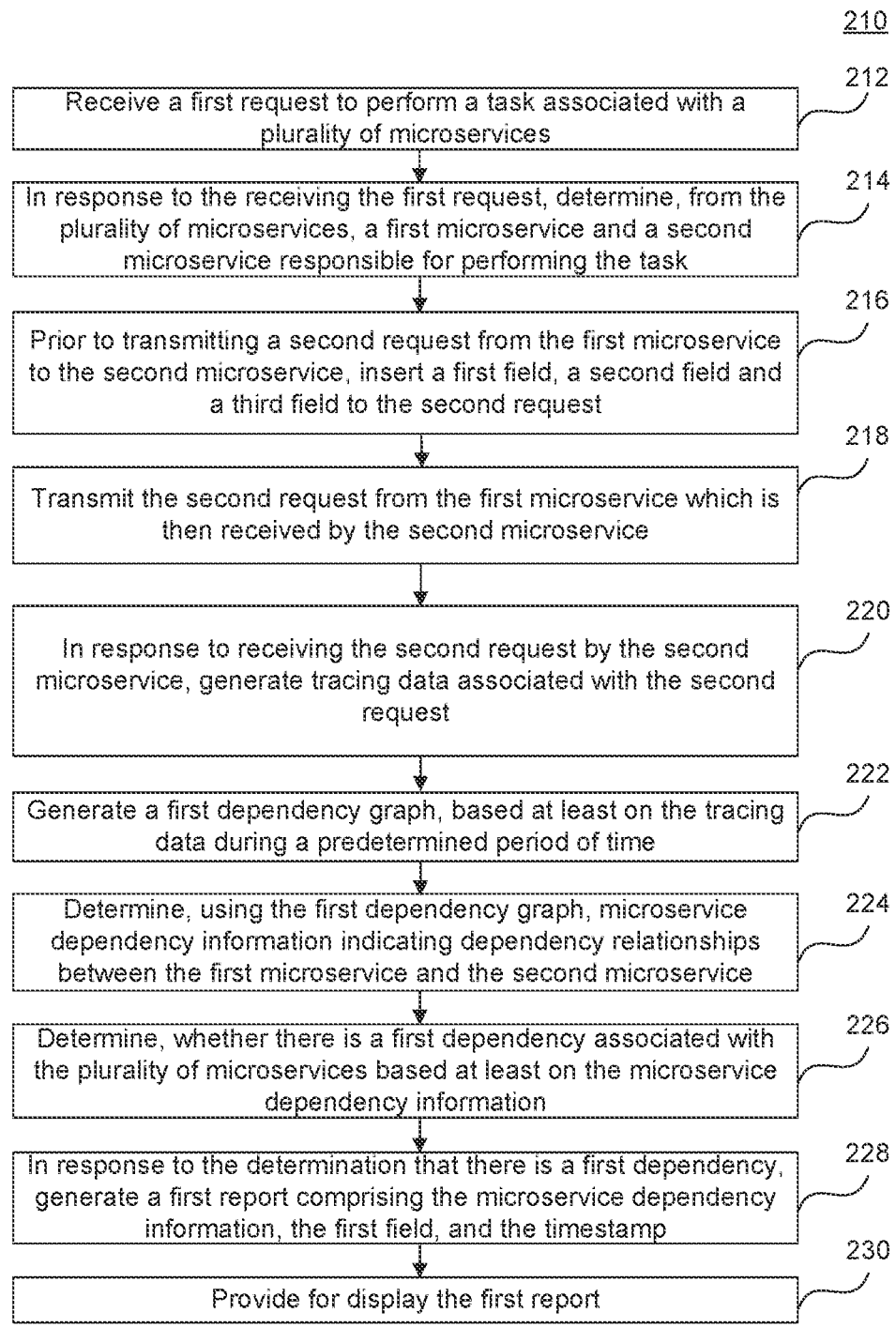
FIG. 2B is a flow diagram that illustrates an exemplary process for determining dependencies associated with microservices, according to some embodiments.

FIG. 2B is a flow diagram that illustrates an exemplary process for determining dependencies associated with microservices, according to some embodiments. As a convenience and not a limitation, FIG. 2B may be described with regard to elements of FIGS. 1A-1C and 2A Method 210 may represent the operation of a computing system (e.g., data processing system 200 of FIG. 2A) for determining dependencies associated a plurality of microservices. But method 210 is not limited to the specific aspects depicted in those figures and other systems may be used to perform the method as will be understood by those skilled in the art. It is to be appreciated that not all operations may be needed, and the operations may not be performed in the same order as shown in FIG. 2B.

In 212, data processing system 200 receives a first request to perform a task associated with the plurality of microservices.

In 214, in response to the receiving the first request, data processing system 200 determines, from the plurality of microservices, a first microservice and a second microservice responsible for performing the task.

In 216, prior to transmitting a second request from the first microservice to the second microservice, data processing system 200 inserts a first field, a second field and a third field into the second request. In some aspects, the first field can include a first identifier associated with the second request. The second field can include a second identifier associated with the first microservice. The third field can include a third identifier associated with an API associated with the first microservice and the second request.

The second request can include an HTTP request. The first field can include a first header of the HTTP request. The second field can include a second header of the HTTP request. The third field can include a third header of the HTTP request.

In one example, as shown as below in Table 1, an example first field may correspond to a first header of "uuid" of the HTTP request. An example second field may correspond to a second header of "origin-service" of the HTTP request. An example third field may correspond to a third header of "origin-api" of the HTTP request.

TABLE 1

Example first header, second header and third header in an HTTP request

| Header Name | Remark | Example value |
| --- | --- | --- |
| uuid | The unique id to identify the link chain. It is generated by the gateway and passed through HTTP header. | 71837000-fe40-ea62-fd31-5648eabc32 |
| origin-service | Current microservice name | service1 |
| origin-api | Current API which the program runs at. | GET /rest/entityA |

In 218, data processing system 200 transmits the second request from the first microservice which is then received by the second microservice.

In some aspects, the second request (e.g., an HTTP request) can be transmitted from the first microservice to the second microservice. The first microservice can perform a remote call to the second microservice. In one example, an example of an HTTP message of the remote call is shown as below in Table 2.

TABLE 2

Example an HTTP message of a remote call

GET /rest/entityC
uuid: 71837000-fe40-ea62-fd31-5648eabc32
origin-service: service1
origin-api: GET /rest/entityA
//other headers
//request payload In 220, in response to receiving the second request by the second microservice, data processing system 200 generates tracing data associated with the second request. The tracing data is associated with a timestamp, the first field, the second field, the third field, the second microservice, and an Application Program Interface (API) associated with the second microservice and the second request.

In some aspects, subsequent to receiving the second request by the second microservice, such as the remote call, data processing system 200 can generate tracing data associated with the second request. Tracing data can be transmitted to and stored in one or more data storage systems 202 or other data storage systems not shown in FIG. 2A. For example, when microservice 102 receives the remote call to its API of "GET/rest/entityC" from microservice 101, the HTTP headers of "uuid, origin-service, and origin-api" can be extracted and stored. In some aspects, tracing data associated with the second request can be saved as an example visit record as shown in Table 3.

TABLE 3

An example tracing data

"timestamp": "2023-01-02T16:34:23.123", "uuid":" 71837000-fe40-ea62-fd31-5648eabc32", "origin-service": "service1", "origin-api": "GET /rest/entity A", "current-service": "service2", "current-api": "GET /rest/entityC"

In one example, one or more fields of the example visit record can be further explained as shown in Table 4.

TABLE 4

Example fields of the tracing data

| Field Name | Remark | Example value |
| --- | --- | --- |
| timestamp | The timestamp of the visit | 2023-01-02T16:34:23.123 |
| uuid | The unique id to identify the link chain. It is read from the HTTP header uuid. | 71837000-fe40-ea62-fd31-5648eabc32 |
| origin-service | The previous microservice name. It is read from the HTTP header origin-service. | service1 |
| origin-api | The previous API of the microservice name. It is read from the HTTP header origin-api. | GET /rest/entity A |
| current-service | Current microservice name | service2 |
| current-api | Current API which the program runs at. | GET /rest/entityC |

In 222, data processing system 200 generates a first dependency graph, based at least on the tracing data during a predetermined period of time. In some aspects, data processing system 200 can transmit a query to receive tracing data during a predetermined period of time. Data processing system 200 can analyze the tracing data during the predetermined period of time and generate the first dependency graph. In some aspects, 222-230 may be described with reference to FIG. 2C.

In some aspects, the first dependency graph can include a first unweighted directed graph with (i) first vertices representing microservices associated with the first field, and (ii) first edges representing microservice call paths between the microservices.

In 224, data processing system 200 determines, using the first dependency graph, microservice dependency information indicating dependency relationships between the first microservice and the second microservice;

In 226, data processing system 200 determines, whether there is a first dependency associated with the plurality of microservices based at least on the microservice dependency information. In some aspects, the first dependency can include a first circular dependency.

Figure 2C:
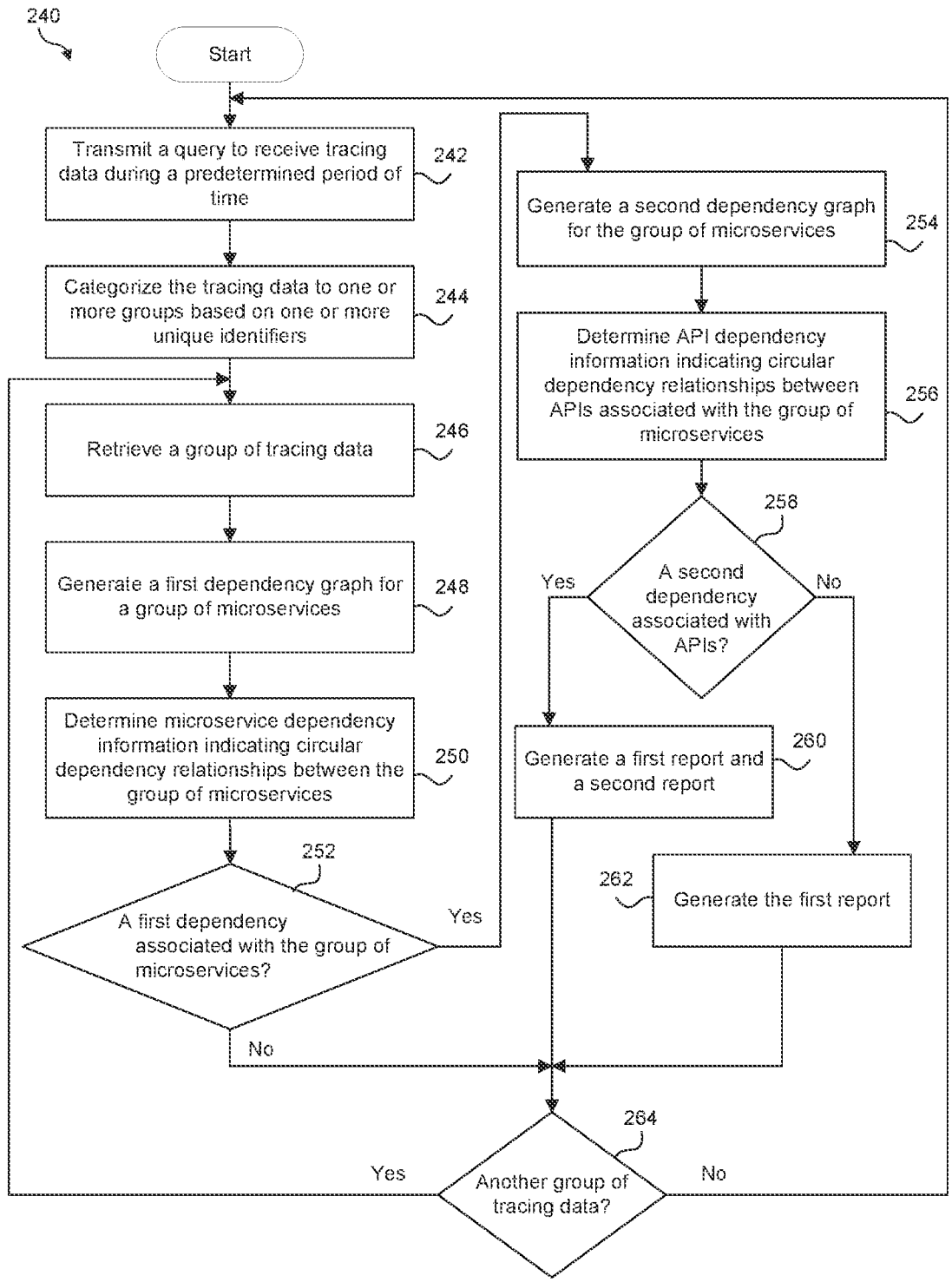
FIG. 2C is a flow diagram that illustrates an exemplary process for analyzing dependencies associated with microservices, according to some embodiments.

In some aspects, 222, 224 and 226 will be further described in an exemplary process for analyzing dependencies associated with microservices as shown in FIG. 2C.

In 228, in response to the determination that there is a first dependency, data processing system 200 generates a first report comprising the microservice dependency information, the first field, and the timestamp.

In 230, data processing system 200 provides for display the first report to one or more users (e.g., users 206).

In some aspects, in response to the determination that there is the first dependency, data processing system 200 can generate a second dependency graph based on the generated tracing data. Data processing system 200 can determine, using the second dependency graph, API dependency information indicating dependency relationships between APIs associated with the first microservice and the second microservice. Data processing system 200 can determine whether there is a second dependency associated with the plurality of microservices based at least on the API dependency information. In some aspects, the second dependency can include a second circular dependency. In response to the determination that there is a second dependency, data processing system 200 can generate a second report comprising the API dependency information, the first field, and the timestamp Data processing system 200 can provide for displaying the second report.

In some aspects, the second dependency graph can include a second unweighted directed graph with (i) second vertices representing APIs associated with the first dependency graph, and (ii) second edges representing API call paths between the APIs.

FIG. 2C is a flow diagram that illustrates an exemplary process for analyzing dependencies associated with microservices, according to some embodiments. As a convenience and not a limitation, FIG. 2C may be described with regard to elements of FIGS. 1A-1C and 2A-2B. Method 240 may represent the operation of a computing system (e.g., data analysis system 204 of FIG. 2A) for determining dependencies (e.g., circular dependencies) associated with a plurality of microservices. But method 240 is not limited to the specific aspects depicted in those figures and other systems may be used to perform the method as will be understood by those skilled in the art. It is to be appreciated that not all operations may be needed, and the operations may not be performed in the same order as shown in FIG. 2C. As described above, method 240 may be described in association with 222, 224 and 226 in FIG. 2B.

In 242, data analysis system 204 transmits a query to receive tracing data (e.g., visit records) during a predetermined period of time, such as visit records with timestamps within the past few (e.g., 5) minutes. As described above, tracing data associated with the second request can be saved as an example visit record as shown in Table 3.

In 244, data analysis system 204 categorizes the tracing data to one or more groups based on one or more unique identifiers (e.g., uuid). As described above, as shown as below in Table 1, an example first field may correspond to a first header of "uuid" of the HTTP request. As shown in Table 4, the unique identifier is configured to identify the chain associated with a request (e.g., second request). The unique identifier can be identified from the HTTP header "uuid". In one example, data analysis system 204 can determine a first group of tracing data having a first unique identifier. Similarly, data analysis system 204 can determine a second group of tracing data having a second unique identifier.

In 246, data analysis system 204 retrieves a group of tracing data. For example, the group of tracing data can include the first group of tracing data having a first unique identifier. Data analysis system 204 can identify a group of microservices, such as a first group of microservices, having the first unique identifier.

In 248, data analysis system 204 generates a first dependency graph for the group of microservices. The first dependency graph can include a directed unweighted graph. The vertices of the directed unweight graph can include identification of the group of microservices (e.g., name of the microservices). The edges of the directed unweight graph can include remote call paths between the group of microservices.

In 250, data analysis system 204 determines, using the first dependency graph, microservice dependency information indicating dependency relationships associated with the group of microservices. In some aspects, the dependency relationships can include circular dependency relationships.

In 252, data analysis system 204 determines, whether there is a first dependency associated with the group of microservices. In some aspects, the first dependency can include a first circular dependency. Data analysis system 204 can perform the determination based at least on the microservice dependency information. In some aspects, data analysis system 204 can perform an analysis on whether there is a circle in the first dependency graph. In some aspects, data analysis system 204 can perform the analysis based on one or more algorithms, including for example, depth-first search or topological sorting.

If no first dependency associated with the group of microservices is determined, method 240 goes to 264. If a first dependency associated with the group of microservices is determined, method 240 goes to 254.

In 254, data analysis system 204 generates a second dependency graph for the group of microservices. The second dependency graph can include a directed unweighted graph. The vertices of the directed unweight graph can include identification APIs of the group of microservices (e.g., name of the APIs). The edges of the directed unweight graph can include remote call paths between APIs of the group of microservices.

In 256, data analysis system 204 determines, using the second dependency graph, API dependency information indicating dependency relationships between APIs associated with the group of microservices. In some aspects, the dependency relationships can include circular dependency relationships.

In 258, data analysis system 204 determines, whether there is a second dependency associated with the APIs. In some aspects, the second dependency can include a second circular dependency. Data analysis system 204 can perform the determination based at least on the API dependency information. In some aspects, data analysis system 204 can perform an analysis on whether there is a circle in the second dependency graph. In some aspects, data analysis system 204 can perform the analysis based on one or more algorithms, including for example, depth-first search or topological sorting.

If a second dependency associated with the APIs is determined, method 240 goes to 260. If no second dependency associated with the APIs is determined, method 240 goes to 262.

In 260, data analysis system 204 generates a first report and a second report. The first report can indicate the first circular dependency associated with the group of microservices. The first report can include the microservice dependency information, the unique identifier of the group of microservices, and the timestamp. The second report can indicate the second circular dependency associated with the APIs. The second report can include the API dependency information, the unique identifier of the group of microservices, and the timestamp. Data analysis system 204 can indicate a priority to fix the second circular dependency associated with the APIs in the second report. Data processing system 200 can provide for displaying the first report and the second report to one or more users.

In 262, data analysis system 204 generates the first report. The first report can indicate the first circular dependency associated with the group of microservices. The first report can include the microservice dependency information, the unique identifier of the group of microservices, and the timestamp. Data processing system 200 can provide for displaying the first report to one or more users.

In 264, data analysis system 204 determines whether there is another group of tracing data. For example, data analysis system 204 can determine a second group of tracing data having a second unique identifier.

If no other group of tracing data is determined, method 264 goes to 242. If another group of tracing data is determined, method 264 goes to 246.

Figure 3:
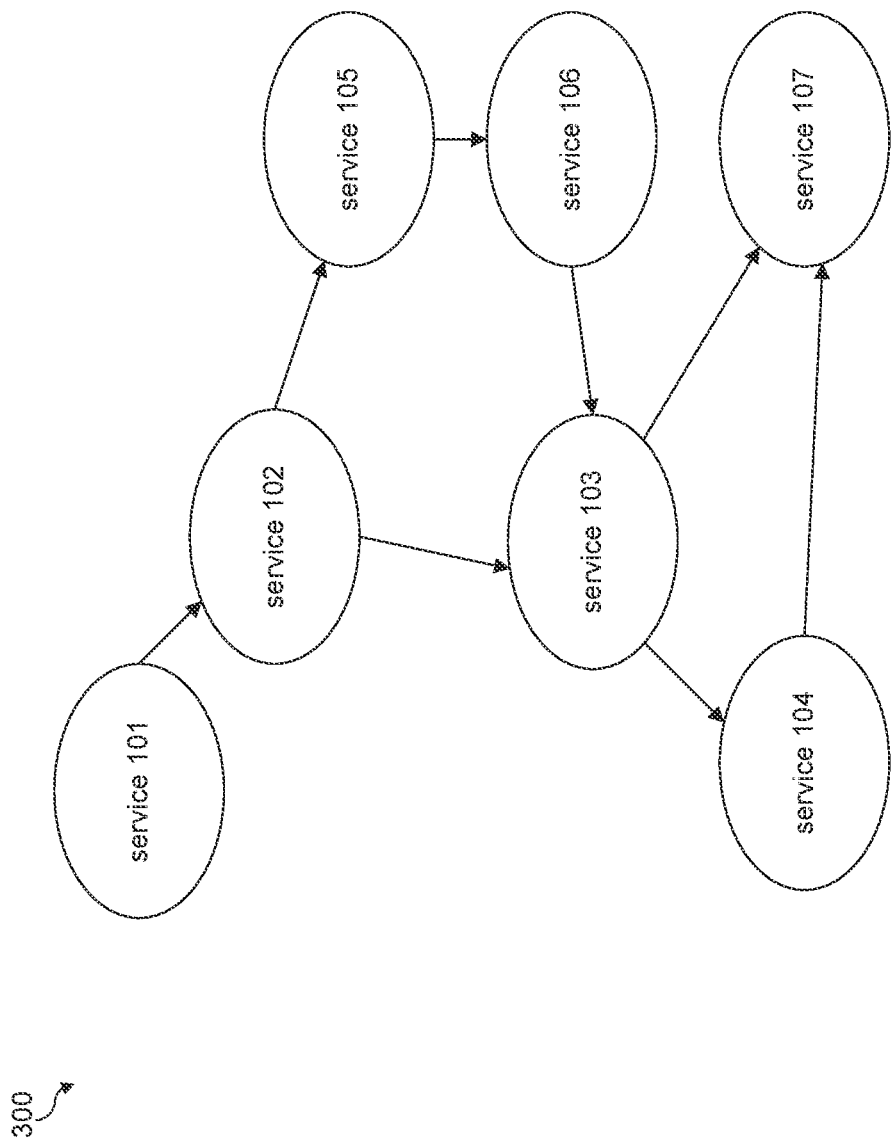
FIG. 3 illustrates a first example of a first dependency graph associated with microservices, according to some embodiments.

FIG. 3 illustrates a first example of a first dependency graph associated with microservices, according to some embodiments. It is noted, however, first dependency graph 300 is provided solely for illustrative purposes, and is not limiting. Embodiments of this disclosure may be implemented using and/or may be part of system different from and/or in addition to the block diagram, as will be appreciated by persons skilled in the relevant art(s) based on the teachings contained herein.

As shown in FIG. 3, no first circular dependency associated with microservices 101-107 is determined in first dependency graph 300. The first dependency graph 300 can be determined based on a first group of tracing data as shown in Table 5:

TABLE 5

Example first group of tracing data (timestamp and uuid removed)

"origin-service: "gateway", "origin-api": "", "current-service": "service101", "current-api": "GET /rest/entity A"
"origin-service": "service101", "origin-api": "GET /rest/entity A", "current-service": "service102", "current-api": "GET /rest/entityB"
"origin-service": "service102", "origin-api": "GET /rest/entityB", "current-service": "service103", "current-api": "GET /rest/entityC"
"origin-service": "service103", "origin-api": "GET /rest/entityC", "current-service": "service104", "current-api": "GET /rest/entityD"
"origin-service": "service104", "origin-api": "GET /rest/entityD", "current-service": "service 107", "current-api": "GET /rest/entityG"
"origin-service": "service102", "origin-api": "GET /rest/entityB", "current-service": "service105", "current-api": "GET /rest/entityE"
"origin-service": "service105", "origin-api": "GET /rest/entityE", "current-service": "service106", "current-api": "GET /rest/entityF"
"origin-service": "service106", "origin-api": "GET /rest/entityF", "current-service": "service103", "current-api": "GET /rest/entityC"

TABLE 5-continued

Example first group of tracing data (timestamp and uuid removed)

"origin-service": "service103", "origin-api": "GET /rest/entityC", "current-service": "service107". "current-api": "GET /rest/entityG"

Figure 4A:
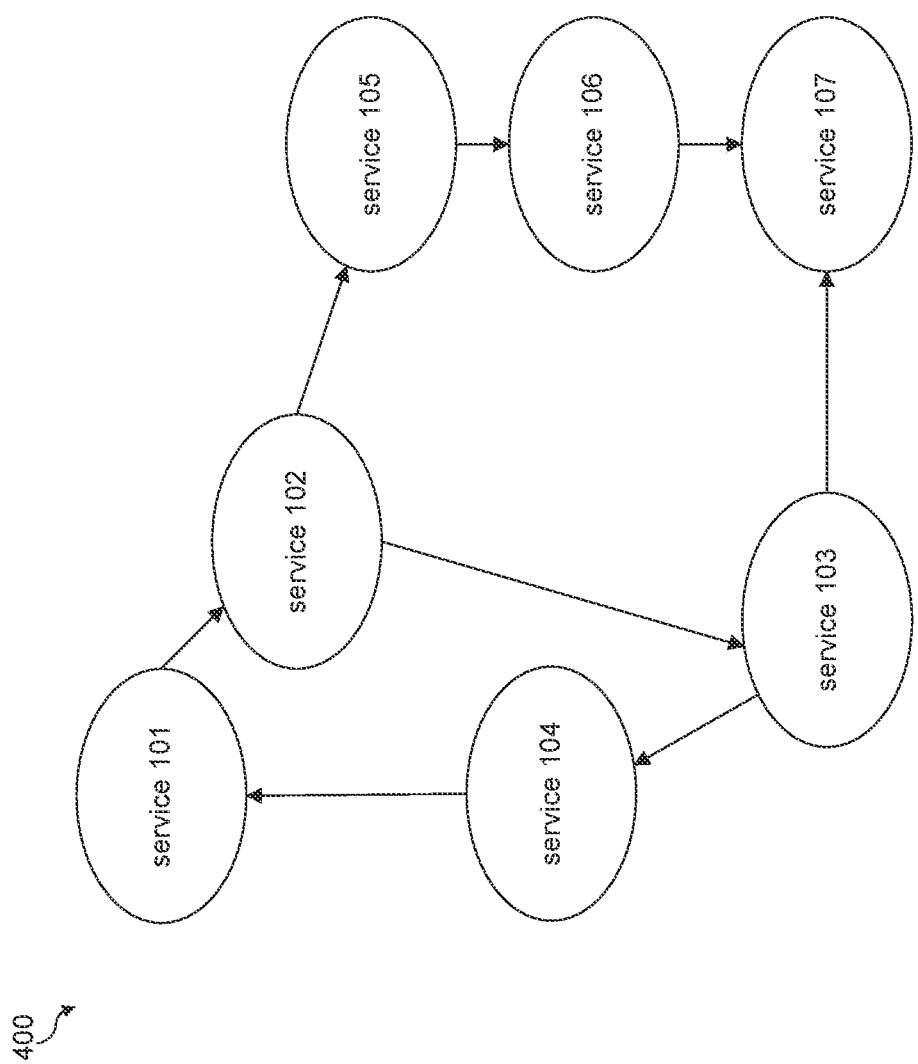
FIG. 4A illustrates a second example of a first dependency graph associated with microservices, according to some embodiments.

FIG. 4A illustrates a second example of a first dependency graph associated with microservices, according to some embodiments. It is noted, however, first dependency graph 400 is provided solely for illustrative purposes, and is not limiting. Embodiments of this disclosure may be implemented using and/or may be part of system different from and/or in addition to the block diagram, as will be appreciated by persons skilled in the relevant art(s) based on the teachings contained herein.

As shown in FIG. 4A, there is first circular dependency between microservices 101, 102, 103 and 104. For example, there is a circle or circular shape in microservice call paths between microservices 101, 102, 103, and 104. A start point of the microservice call paths between microservices 101, 102, 103, and 104 can correspond to an end point of the microservice call paths between microservices 101, 102, 103, and 104.

The first dependency graph 400 can be determined based on a second group of tracing data as shown in Table 6:

TABLE 6

Example second group of tracing data (timestamp and uuid removed)

"origin-service": "gateway", "origin-api": "", "current-service": "service101", "current-api": "GET /rest/entity A"
"origin-service": "service101", "origin-api": "GET /rest/entity A", "current-service": "service102", "current-api": "GET /rest/entityB"
"origin-service": "service102", "origin-api": "GET /rest/entityB", "current-service": "service103", "current-api": "GET /rest/entityC"
"origin-service": "service103", "origin-api": "GET /rest/entityC", "current-service": "service104", "current-api": "GET /rest/entityD"
"origin-service": "service104", "origin-api": "GET /rest/entityD", "current-service": "service101", "current-api": "GET /rest/entityH"
"origin-service": "service102", "origin-api": "GET /rest/entityB", "current-service": "service105", "current-api": "GET /rest/entityE"
"origin-service": "service105", "origin-api": "GET /rest/entityE", "current-service": "service106", "current-api": "GET /rest/entityF"
"origin-service": "service106", "origin-api": "GET /rest/entityF", "current-service": "service107", "current-api": "GET /rest/entityG"
"origin-service": "service103", "origin-api": "GET /rest/entityC", "current-service": "service107", "current-api": "GET /rest/entityH"

Figure 4B:
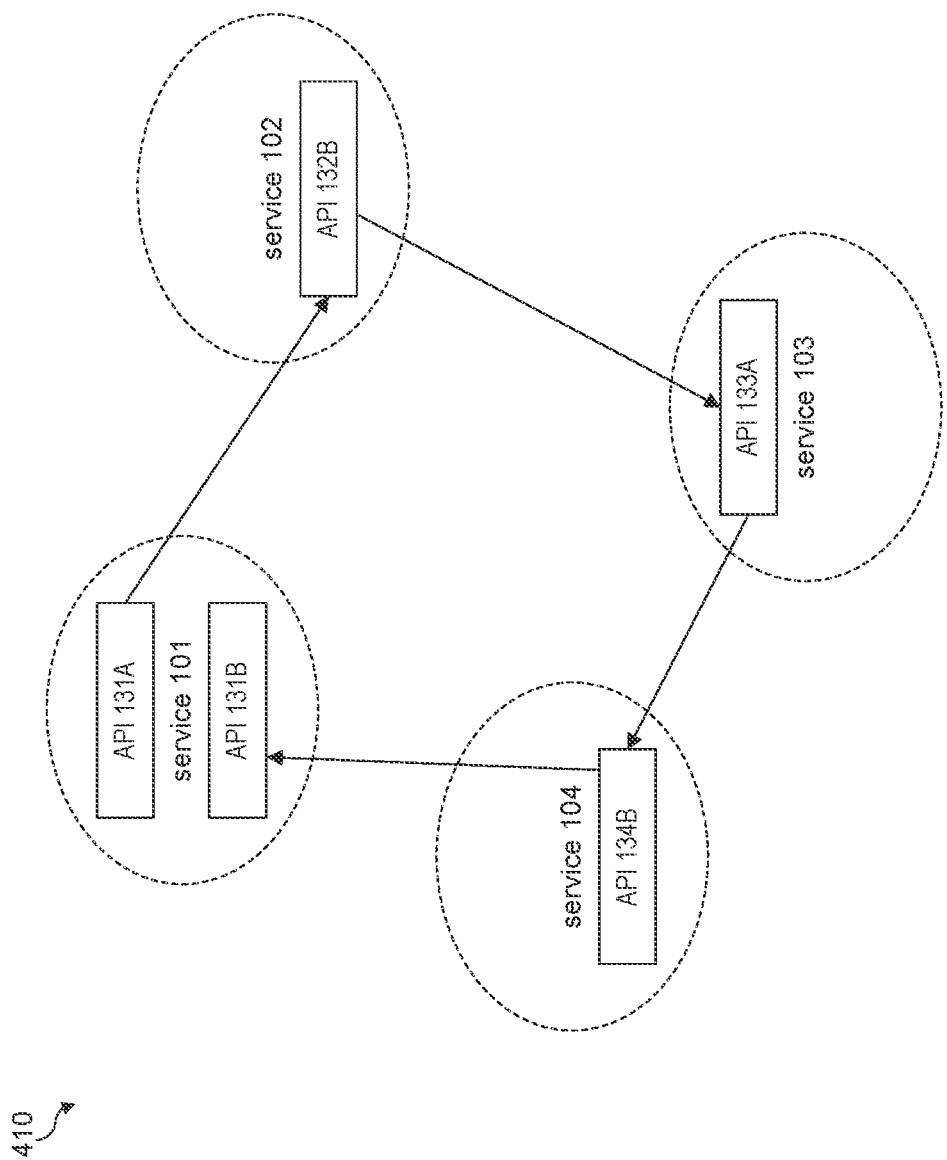
FIG. 4B illustrates a second example of a second dependency graph associated with microservices, according to some embodiments.

FIG. 4B illustrates a second example of a second dependency graph associated with microservices, according to some embodiments. It is noted, however, second dependency graph 410 is provided solely for illustrative purposes, and is not limiting. Embodiments of this disclosure may be implemented using and/or may be part of system different from and/or in addition to the block diagram, as will be appreciated by persons skilled in the relevant art(s) based on the teachings contained herein.

The second dependency graph 410 can be determined based on the second group of tracing data as shown in Table 6 described above.

In response to the determination that there is first dependency between microservices 101, 102, 103 and 104 as shown in FIG. 4A, whether there is a second dependency, such as a second circular dependency, between APIs of microservices 101, 102, 103, and 104 can be determined based on the second dependency graph 410.

As shown in FIG. 4B, there is no second dependency, such as a second circular dependency, between APIs 131A, 132B, 133A, 134B and 131B of microservices 101, 102, 103, and 104. For example, there is not a circle or circular shape in microservice call paths between APIs 131A, 132B, 133A, 134B, and 131B. A start point of the microservice call paths between APIs 131A, 132B, 133A, 134B, and 131B does not correspond to an end point of the microservice call paths between APIs 131A, 132B, 133A, 134B, and 131B.

Figure 5A:
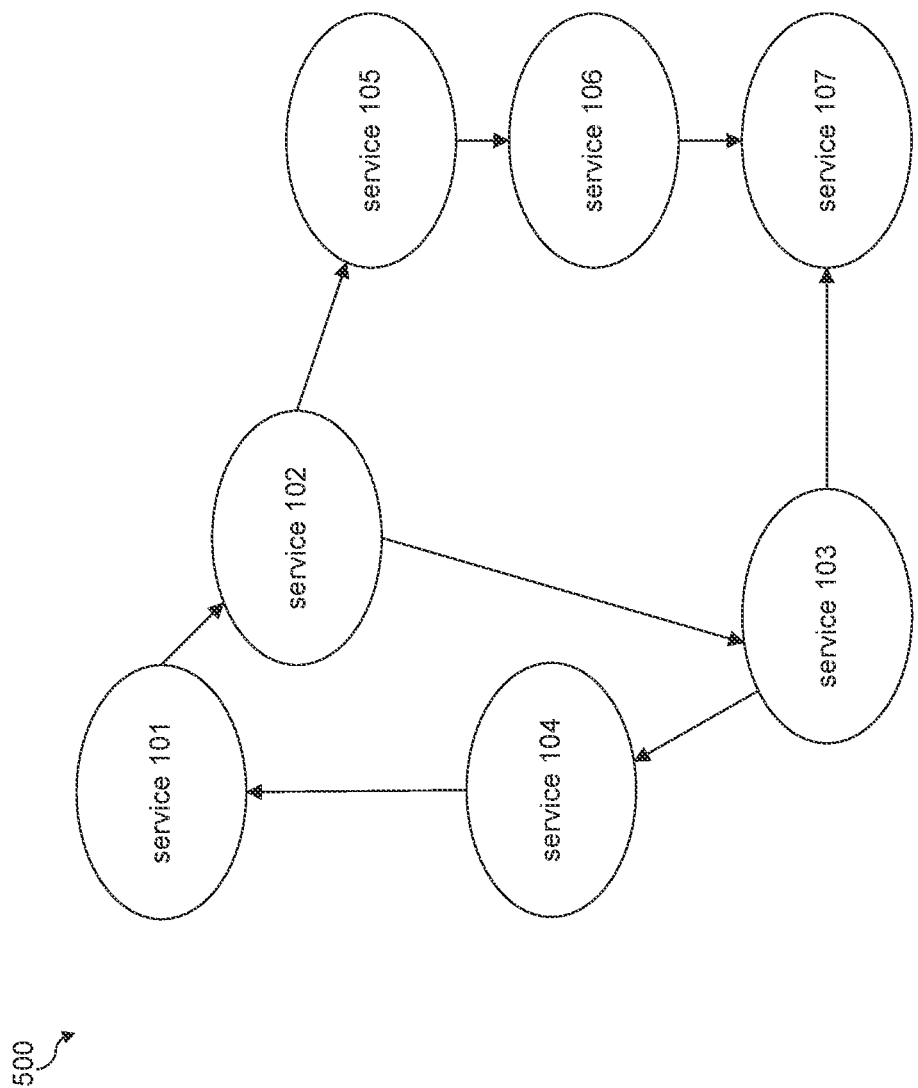
FIG. 5A illustrates a third example of a first dependency graph associated with microservices, according to some embodiments.

FIG. 5A illustrates a third example of a first dependency graph associated with microservices, according to some embodiments. It is noted, however, first dependency graph 500 is provided solely for illustrative purposes, and is not limiting. Embodiments of this disclosure may be implemented using and/or may be part of system different from and/or in addition to the block diagram, as will be appreciated by persons skilled in the relevant art(s) based on the teachings contained herein.

As shown in FIG. 5A, there is first dependency between microservices 101, 102, 103 and 104. For example, there is a circle or circular shape in microservice call paths between microservices 101, 102, 103, and 104. A start point of the microservice call paths between microservices 101, 102, 103, and 104 can correspond to an end point of the microservice call paths between microservices 101, 102, 103, and 104.

The first dependency graph 500 can be determined based on a third group of tracing data as shown in Table 7:

TABLE 7

Example third group of tracing data (timestamp and uuid removed)

"origin-service": "gateway", "origin-api": "", "current-service": "service1", "current-api": "GET /rest/entity A"

TABLE 7-continued

Example third group of tracing data (timestamp and uuid removed)

"origin-service": "service101", "origin-api": "GET /rest/entity A", "current-service": "service102",
"current-api": "GET /rest/entityB"
"origin-service": "service102", "origin-api": "GET /rest/entityB", "current-service": "service103",
current-api": "GET /rest/entityC"
"origin-service": "service103", "origin-api": "GET /rest/entityC", "current-service": "service104",
"current-api": "GET /rest/entityD"
"origin-service": "service104", "origin-api": "GET /rest/entityD", "current-service": "service101",
"current-api": "GET /rest/entity A"
"origin-service": "service 102", "origin-api": "GET /rest/entityB", "current-service": "service105".
"current-api": "GET /rest/entityE"
origin-service": "service105", "origin-api": "GET /rest/entityE", "current-service": "service106",
"current-api": "GET /rest/entityF"
"origin-service": "service106", "origin-api": "GET /rest/entityF", "current-service": "service107".
"current-api": "GET /rest/entityG"
"origin-service": "service103", "origin-api": "GET /rest/entityC", "current-service": "service107"
"current-api": "GET /rest/entityH"

Figure 5B:
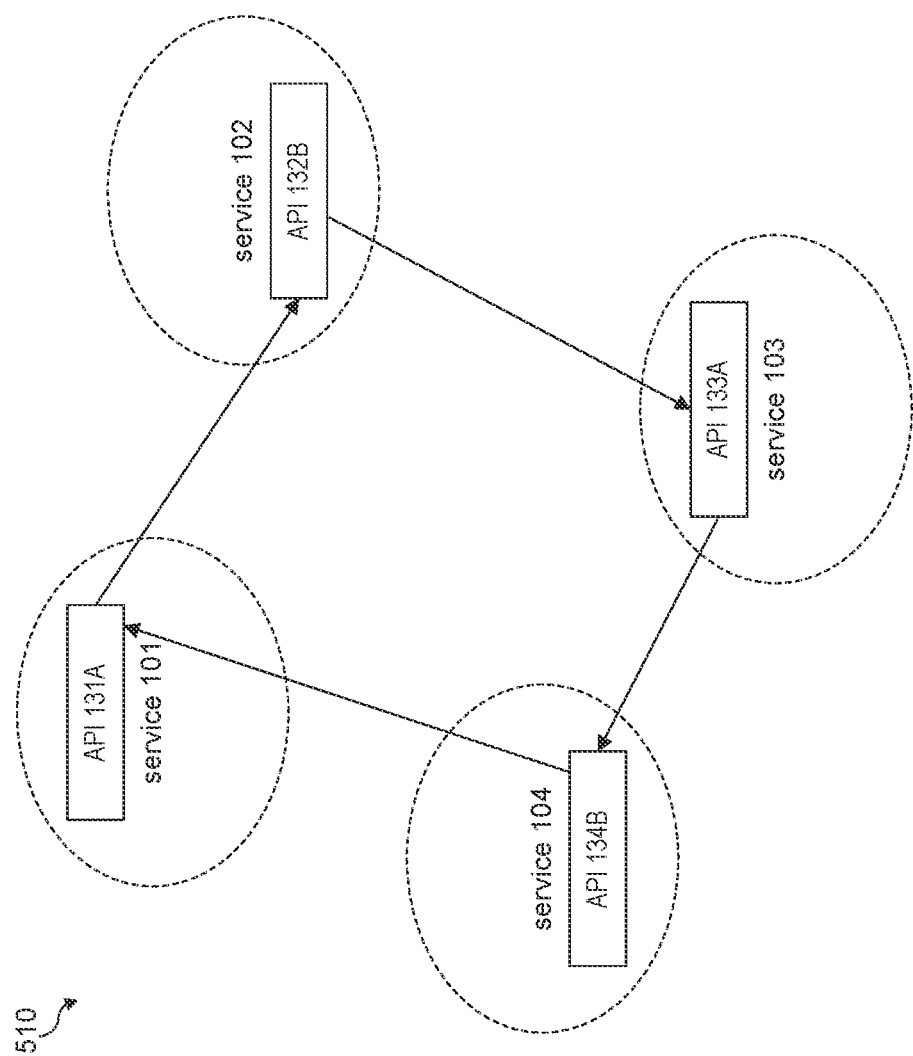
FIG. 5B illustrates a third example of a second dependency graph associated with microservices, according to some embodiments.

FIG. 5B illustrates a third example of a second dependency graph associated with microservices, according to some embodiments. It is noted, however, second dependency graph 510 is provided solely for illustrative purposes, and is not limiting. Embodiments of this disclosure may be implemented using and/or may be part of system different from and/or in addition to the block diagram, as will be appreciated by persons skilled in the relevant art(s) based on the teachings contained herein.

The second dependency graph 510 can be determined based on the second group of tracing data as shown in Table 7 described above.

In response to the determination that there is first circular dependency between microservices 101, 102, 103 and 104 as shown in FIG. 5A, whether there is a second circular dependency between APIs of microservices 101, 102, 103, and 104 can be determined based on the second dependency graph 510.

As shown in FIG. 5B, there is a second circular dependency between APIs of microservices 101, 102, 103, and 104. For example, there is a circle or circular shape in microservice call paths between APIs 131A, 132B, 133A, and 134B. A start point of the microservice call paths between APIs 131A, 132B, 133A, and 134B can correspond to an end point of the microservice call paths between APIs 131A, 132B, 133A, and 134B.

Figure 6A:
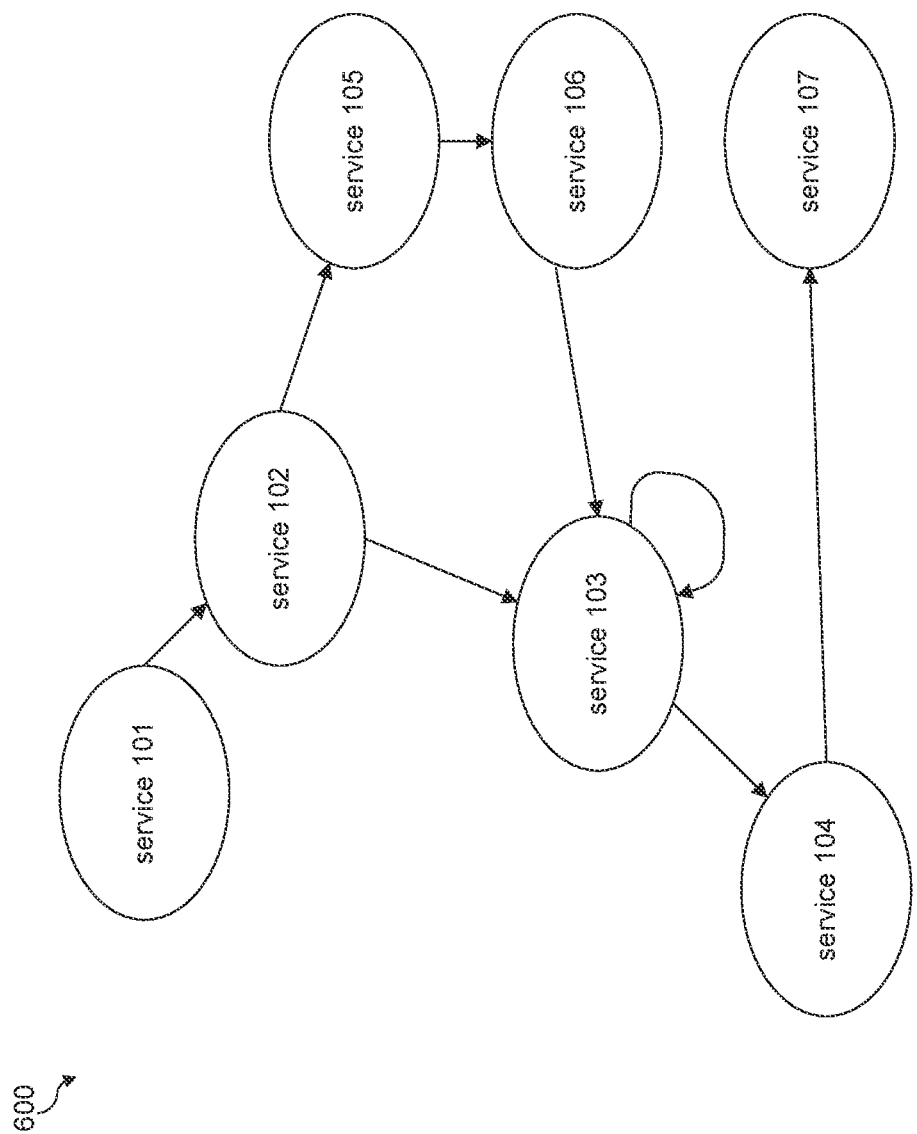
FIG. 6A illustrates a fourth example of a first dependency graph associated with microservices, according to some embodiments.

FIG. 6A illustrates a fourth example of a first dependency graph associated with microservices, according to some embodiments. It is noted, however, first dependency graph 600 is provided solely for illustrative purposes, and is not limiting. Embodiments of this disclosure may be implemented using and/or may be part of system different from and/or in addition to the block diagram, as will be appreciated by persons skilled in the relevant art(s) based on the teachings contained herein.

As shown in FIG. 6A, there is first circular dependency associated with microservice 103. For example, there is a circle or circular shape in microservice call paths associated with microservice 103. A start point of the microservice call paths associated with microservice 103 can correspond to an end point of the microservice call paths associated with microservice 103.

The first dependency graph 600 can be determined based on a fourth group of tracing data as shown in Table 8:

TABLE 8

Example fourth group of tracing data (timestamp and uuid removed)

"origin-service": "gateway", "origin-api": "", "current-service": "service101", "current-api";
"GET /rest/entity A"
"origin-service": "service101", "origin-api": "GET /rest/entity A", "current-service":
"service102", "current-api": "GET /rest/entityB"
"origin-service": "service 102", "origin-api": "GET /rest/entityB", "current-service":
"service103", "current-api": "GET /rest/entityC"
"origin-service": "service103", "origin-api": "GET /rest/entityC", "current-service":
"service4", "current-api": "GET /rest/entityD"
"origin-service": "service104", "origin-api": "GET /rest/entityD", "current-service":
"service107", "current-api": "GET /rest/entityG"
"origin-service": "service102", "origin-api": "GET /rest/entityB", "current-service":
"service105", "current-api": "GET /rest/entityE"
"origin-service": "service105", "origin-api": "GET /rest/entityE", "current-service":
"service106", "current-api": "GET /rest/entityF"
"origin-service": "service 106", "origin-api": "GET /rest/entityF", "current-service":
"service103", "current-api": "GET /rest/entityH"
"origin-service": "service103", "origin-api": "GET /rest/entityH", "current-service"
"service103", "current-api": "GET /rest/entity!"

Figure 6B:
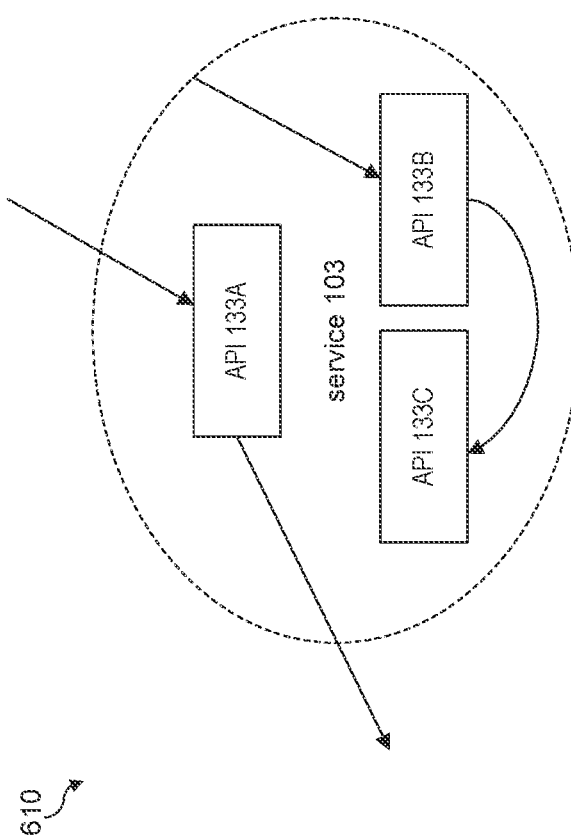
FIG. 6B illustrates a fourth example of a second dependency graph associated with microservices, according to some embodiments.

FIG. 6B illustrates a fourth example of a second dependency graph associated with microservices, according to some embodiments. It is noted, however, second dependency graph 610 is provided solely for illustrative purposes, and is not limiting. Embodiments of this disclosure may be implemented using and/or may be part of system different from and/or in addition to the block diagram, as will be appreciated by persons skilled in the relevant art(s) based on the teachings contained herein.

The second dependency graph 610 can be determined based on the fourth group of tracing data as shown in Table 8 described above.

In response to the determination that there is first circular dependency associated with microservice 103 as shown in FIG. 6A, whether there is a second circular dependency between APIs associated with microservice 103 can be determined based on the second dependency graph 610.

As shown in FIG. 6B, there is no second circular dependency between APIs of microservices 101, 102, 103, and 104. For example, there is not a circle or circular shape in microservice call paths between APIs 133A, 133B and 133C. A start point of the microservice call paths between APIs 133A, 133B and 133C does not correspond to an end point of the microservice call paths between APIs 133A, 133B and 133C.

Figure 7:
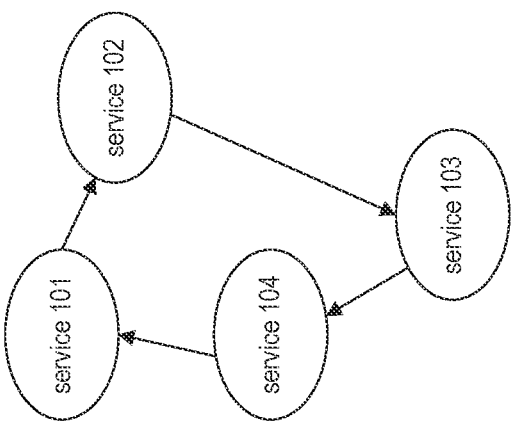
FIG. 7 illustrates a first example graphical user interface for a first dependency associated with microservices, according to some embodiments.

FIG. 7 illustrates a first example graphical user interface for a first circular dependency associated with microservices, according to some embodiments. It is noted, however, graphical user interface 700 is provided solely for illustrative purposes, and is not limiting. Embodiments of this disclosure may be implemented using and/or may be part of system different from and/or in addition to the block diagram, as will be appreciated by persons skilled in the relevant art(s) based on the teachings contained herein.

As described above, data analysis system 204 generates a first report. The first report can indicate the first circular dependency associated with the group of microservices. The first report can include the microservice dependency information, the unique identifier of the group of microservices, and the timestamp.

As shown in FIG. 7, the first report is displayed in graphical user interface 700. Graphical user interface 700 includes a title of the first report, a priority, a service circular path, circular visualization, and call trace information (e.g., uuid, timestamp, and logs link).

In some aspects, one or more user can determine a priority to fix the first dependency between the microservices based on the first report in graphical user interface 700. In some aspects, one or more user can interact with graphical user interface 700, such as to select the logs link in the call trace information. In some aspects, one or more user can edit one or more microservices associated with the service circular path in FIG. 7, such as to remove, modify or add one or more microservices, to correct the first circular dependency. For example, one or more user can select the logs link to edit at least a portion of the microservices associated with the service circular path in FIG. 7.

Figure 8:
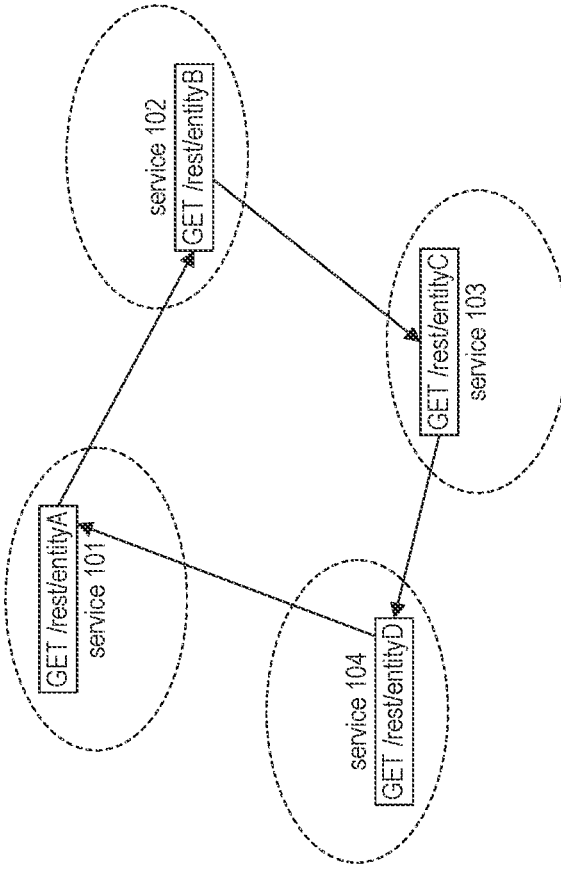
FIG. 8 illustrates a second example graphical user interface for a first dependency and a second dependency associated with microservices, according to some embodiments.

FIG. 8 illustrates a second example graphical user interface for a first dependency and a second dependency associated with microservices, according to some embodiments. It is noted, however, graphical user interface 800 is provided solely for illustrative purposes, and is not limiting. Embodiments of this disclosure may be implemented using and/or may be part of system different from and/or in addition to the block diagram, as will be appreciated by persons skilled in the relevant art(s) based on the teachings contained herein.

As described above, data analysis system 204 generates a first report and a second report. The first report can indicate the first dependency associated with the group of microservices. The first report can include the microservice dependency information, the unique identifier of the group of microservices, and the timestamp. The second report can indicate the second dependency associated with the APIs. The second report can include the API dependency information, the unique identifier of the group of microservices, and the timestamp. Data analysis system 204 can indicate a priority to fix the second dependency associated with the APIs in the second report.

As shown in FIG. 8, the first report and the second report can be combined and displayed in graphical user interface 800. Graphical user interface 800 includes a title, a priority, a service circular path, circular visualization, and call trace information (e.g., uuid, timestamp, and logs link).

In some aspects, one or more user can determine a priority to fix the second dependency between the microservices based on graphical user interface 800. In some aspects, one or more user can interact with graphical user interface 800, such as to select the logs link in the call trace information. In some aspects, one or more user can edit one or more APIs and/or microservices associated with the service circular path in FIG. 8, such as to remove, modify or add one or more APIs and/or microservices to correct the second circular dependency and/or the first circular dependency. For example, one or more user can select the logs link to edit at least a portion of one or more APIs and/or at least a portion of the microservices associated with the service circular path in FIG. 8.

Figure 9:
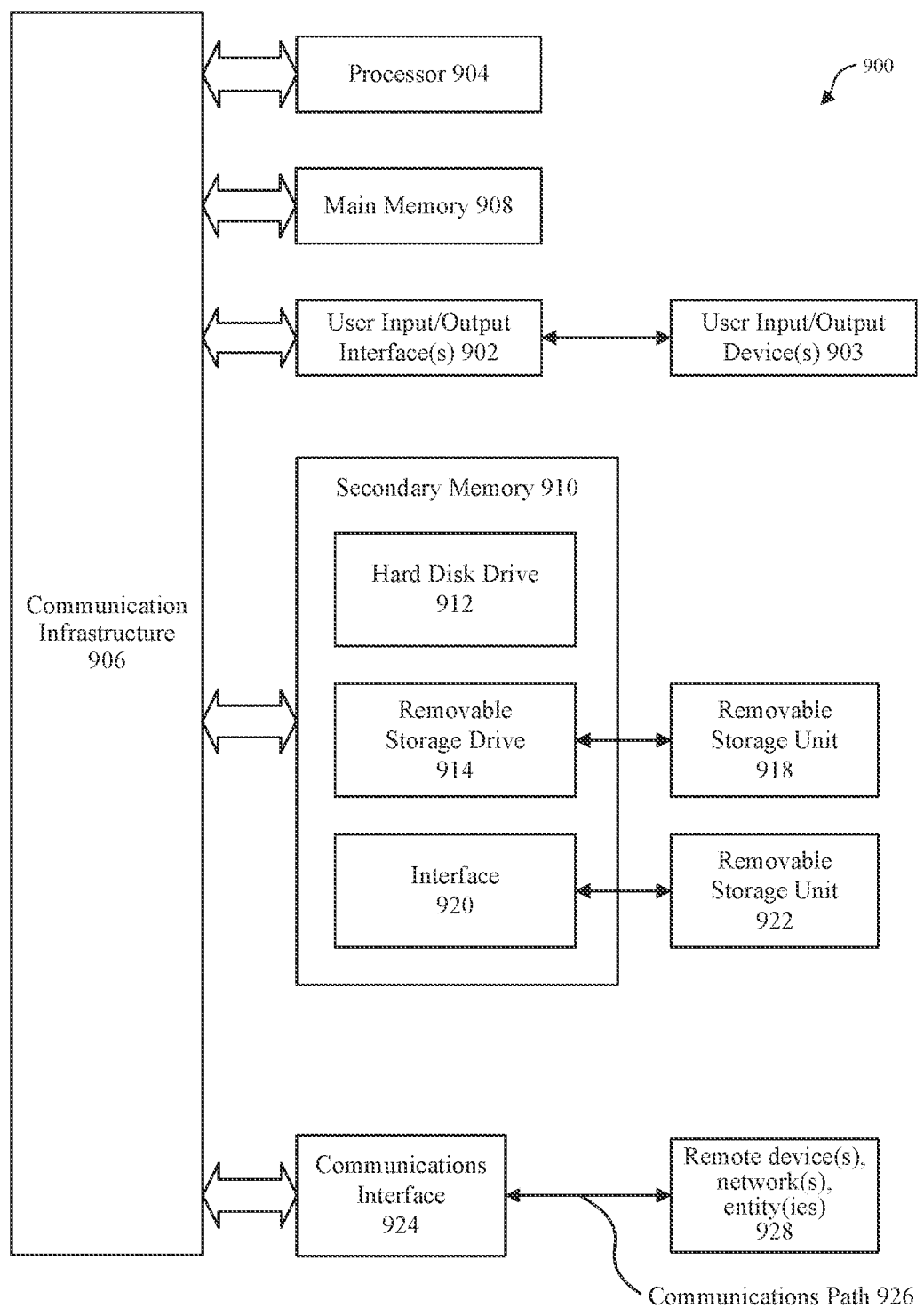
FIG. 9 is an example computer system useful for implementing various embodiments.

Various embodiments may be implemented, for example, using one or more well-known computer systems, such as computer system 900 shown in FIG. 9. One or more computer systems 900 may be used, for example, to implement any of the embodiments discussed herein, as well as combinations and sub-combinations thereof.

Computer system 900 may include one or more processors (also called central processing units, or CPUs), such as a processor 904. Processor 904 may be connected to a communication infrastructure or bus 906.

Computer system 900 may also include user input/output device(s) 903, such as monitors, keyboards, pointing devices, etc., which may communicate with communication infrastructure 906 through user input/output interface(s) 902.

One or more of processors 904 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 900 may also include a main or primary memory 908, such as random access memory (RAM). Main memory 908 may include one or more levels of cache. Main memory 908 may have stored therein control logic (i.e., computer software) and/or data.

Computer system 900 may also include one or more secondary storage devices or memory 910. Secondary memory 910 may include, for example, a hard disk drive 912 and/or a removable storage device or drive 914. Removable storage drive 914 may be a floppy disk drive, a magnetic tape drive, a compact disk drive, an optical storage device, tape backup device, and/or any other storage device/drive.

Removable storage drive 914 may interact with a removable storage unit 918. Removable storage unit 918 may include a computer usable or readable storage device having stored thereon computer software (control logic) and/or data. Removable storage unit 918 may be a floppy disk, magnetic tape, compact disk, DVD, optical storage disk, and/any other computer data storage device. Removable storage drive 914 may read from and/or write to removable storage unit 918.

Secondary memory 910 may include other means, devices, components, instrumentalities or other approaches for allowing computer programs and/or other instructions and/or data to be accessed by computer system 900. Such means, devices, components, instrumentalities or other approaches may include, for example, a removable storage unit 922 and an interface 920. Examples of the removable storage unit 922 and the interface 920 may include a program cartridge and cartridge interface (such as that found in video game devices), a removable memory chip (such as an EPROM or PROM) and associated socket, a memory stick and USB or other port, a memory card and associated memory card slot, and/or any other removable storage unit and associated interface.

Computer system 900 may further include a communication or network interface 924. Communication interface 924 may enable computer system 900 to communicate and interact with any combination of external devices, external networks, external entities, etc. (individually and collectively referenced by reference number 928). For example, communication interface 924 may allow computer system 900 to communicate with external or remote devices 928 over communications path 926, which may be wired and/or wireless (or a combination thereof), and which may include any combination of LANs, WANs, the Internet, etc. Control logic and/or data may be transmitted to and from computer system 900 via communication path 926.

Computer system 900 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 900 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 900 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 900, main memory 908, secondary memory 910, and removable storage units 918 and 922, as well as tangible articles of manufacture embodying any combination of the foregoing. Such control logic, when executed by one or more data processing devices (such as computer system 900 or processor(s) 904), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 9. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer-implemented method for determining dependency associated with a plurality of microservices, the computer-implemented method comprising:
receiving a first request to perform a task associated with the plurality of microservices;
in response to the receiving the first request, determining, from the plurality of microservices, a first microservice and a second microservice responsible for performing the task;
prior to transmitting a second request from the first microservice to the second microservice, inserting a first field, a second field and a third field to the second request;
transmitting the second request from the first microservice to the second microservice;
receiving the second request at the second microservice from the first microservice;
in response to the receiving the second request by the second microservice, generating tracing data associated with the second request, wherein the tracing data is associated with a timestamp, the first field, the second field, the third field, the second microservice, and an Application Program Interface (API) associated with the second microservice and the second request;
generating a first dependency graph based at least on the tracing data;
determining there is a first dependency associated with the plurality of microservices based at least on the first dependency graph;
in response to the determination that there is the first dependency, generating a first report comprising the first dependency graph, the first field, and the timestamp;
providing for display the first report; and
receiving input to modify at least a portion of the microservices, wherein at least one of the receiving, determining, inserting, generating are performed by one or more computing systems.

2. The computer-implemented method of claim 1, wherein the first dependency graph comprises: a first unweighted directed graph with (i) first vertices representing microservices associated with the first field, and (ii) first edges representing microservice call paths between the microservices.

3. The computer-implemented method of claim 1, further comprising:
in response to the determination that there is the first dependency, generating a second dependency graph based on the tracing data;
determining, using the second dependency graph, API dependency information indicating dependency relationships between APIs associated with the first microservice and the second microservice;
determining, whether there is a second dependency associated with the plurality of microservices based at least on the API dependency information;
in response to the determination that there is the second dependency, generating a second report comprising the API dependency information, the first field, and the timestamp; and
providing for display the second report.

4. The computer-implemented method of claim 3, wherein the second dependency graph comprises: a second unweighted directed graph with (i) second vertices representing APIs associated with the first dependency graph, and (ii) second edges representing API call paths between the APIs.

5. The computer-implemented method of claim 1, wherein the first field comprises a first identifier associated with the second request, wherein the second field comprises a second identifier associated with the first microservice, and wherein the third field comprises a third identifier associated with an API associated with the first microservice and the second request.

6. The computer-implemented method of claim 1, wherein the generating the first dependency graph based at least on the tracing data comprises generating the first dependency graph based at least on the tracing data during a predetermined period of time.

7. The computer-implemented method of claim 1, wherein the second request comprises an HTTP request, wherein the first field comprises a first header of the HTTP request, wherein the second field comprises a second header of the HTTP request, and wherein the third field comprises a third header of the HTTP request.

8. A system for determining dependency associated with a plurality of microservices, comprising:
a memory; and
at least one processor coupled to the memory and configured to:
receive a first request to perform a task associated with the plurality of microservices;
in response to the receiving the first request, determine, from the plurality of microservices, a first microservice and a second microservice responsible for performing the task;
prior to transmitting a second request from the first microservice to the second microservice, insert a first field, a second field and a third field to the second request;
transmit the second request from the first microservice to the second microservice;
receive the second request at the second microservice from the first microservice;
in response to the receiving the second request by the second microservice, generate tracing data associated with the second request, wherein the tracing data is associated with a timestamp, the first field, the second field, the third field, the second microservice, and an Application Program Interface (API) associated with the second microservice and the second request;
generate a first dependency graph, based at least on the tracing data;
determine there is a first dependency associated with the plurality of microservices based at least on the first dependency graph;
in response to the determination that there is the first dependency, generate a first report comprising the first dependency graph, the first field, and the timestamp;
provide for display the first report; and
receive input to modify at least a portion of the microservices.

9. The system of claim 8, wherein the first dependency graph comprises: a first unweighted directed graph with (i) first vertices representing microservices associated with the first field, and (ii) first edges representing microservice call paths between the microservices.

10. The system of claim 8, wherein the at least one processor is further configured to:

in response to the determination that there is the first dependency, generate a second dependency graph based on the tracing data;
determine using the second dependency graph, API dependency information indicating dependency relationships between APIs associated with the first microservice and the second microservice;
determine whether there is a second dependency associated with the plurality of microservices based at least on the API dependency information;
in response to the determination that there is the second dependency, generate a second report comprising the API dependency information, the first field, and the timestamp; and
provide for display the second report.

11. The system of claim 10, wherein the second dependency graph comprises: a second unweighted directed graph with (i) second vertices representing APIs associated with the first dependency graph, and (ii) second edges representing API call paths between the APIs.

12. The system of claim 8, wherein the first field comprises a first identifier associated with the second request, wherein the second field comprises a second identifier associated with the first microservice, and wherein the third field comprises a third identifier associated with an API associated with the first microservice and the second request.

13. The system of claim 8, wherein the generating the first dependency graph based at least on the tracing data comprises generating the first dependency graph based at least on the tracing data during a predetermined period of time.

14. The system of claim 8, wherein the second request comprises an HTTP request, wherein the first field comprises a first header of the HTTP request, wherein the second field comprises a second header of the HTTP request, and wherein the third field comprises a third header of the HTTP request.

15. A non-transitory computer-readable medium having instructions stored thereon that, when executed by at least one computing device, cause the at least one computing device to perform operations comprising:
receiving a first request to perform a task associated with the plurality of microservices;
in response to the receiving the first request, determining, from the plurality of microservices, a first microservice and a second microservice responsible for performing the task;
prior to transmitting a second request from the first microservice to the second microservice, inserting a first field, a second field and a third field to the second request;
transmitting the second request from the first microservice to the second microservice;
receiving the second request at the second microservice from the first microservice;
in response to the receiving the second request by the second microservice, generating tracing data associated with the second request, wherein the tracing data is associated with a timestamp, the first field, the second field, the third field, the second microservice, and an Application Program Interface (API) associated with the second microservice and the second request;
generating a first dependency graph, based at least on the tracing data;
determining there is a first dependency associated with the plurality of microservices based at least on the first dependency graph;
in response to the determination that there is the first dependency, generating a first report comprising the first dependency graph, the first field, and the timestamp;
providing for display the first report; and
receiving input to modify at least a portion of the microservices.

16. The non-transitory computer-readable medium of claim 15, wherein the first dependency graph comprises: a first unweighted directed graph with (i) first vertices representing microservices associated with the first field, and (ii) first edges representing microservice call paths between the microservices.

17. The non-transitory computer-readable medium of claim 15, the operations further comprising:
in response to the determination that there is the first dependency, generating a second dependency graph based on the tracing data;
determining, using the second dependency graph, API dependency information indicating dependency relationships between APIs associated with the first microservice and the second microservice;
determining, whether there is a second dependency associated with the plurality of microservices based at least on the API dependency information;
in response to the determination that there is the second dependency, generating a second report comprising the API dependency information, the first field, and the timestamp; and
providing for display the second report; and
receiving input to modify at least a portion of the microservices.

18. The non-transitory computer-readable medium of claim 17, wherein the second dependency graph comprises: a second unweighted directed graph with (i) second vertices representing APIs associated with the first dependency graph, and (ii) second edges representing API call paths between the APIs.

19. The non-transitory computer-readable medium of claim 15, wherein the first field comprises a first identifier associated with the second request, wherein the second field comprises a second identifier associated with the first microservice, and wherein the third field comprises a third identifier associated with an API associated with the first microservice and the second request.

20. The non-transitory computer-readable medium of claim 15, wherein the second request comprises an HTTP request.

* * * * *